Figure 5:
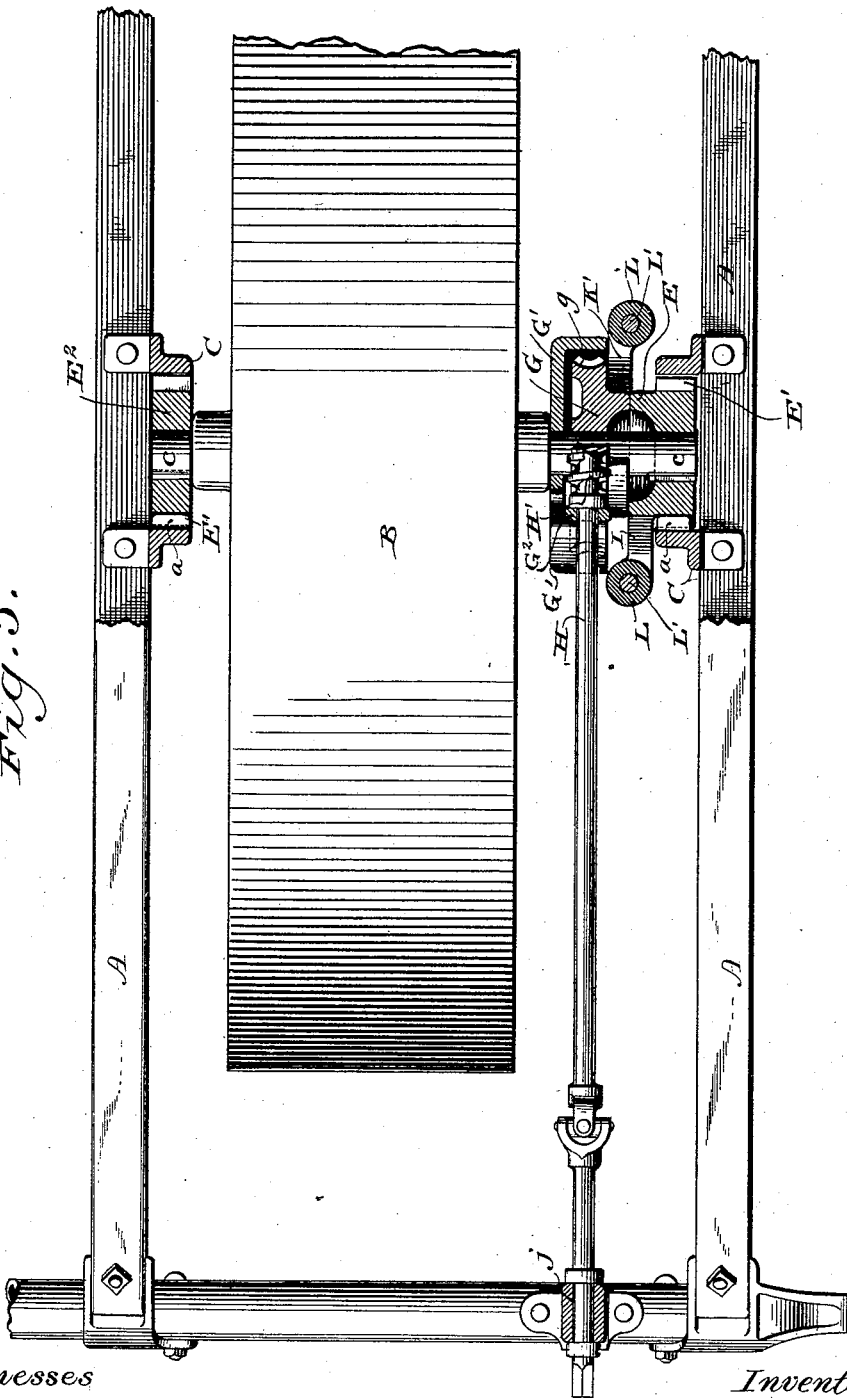

(No Model.) 2 Sheets—Sheet 1.
J. W. LATIMER.
RAISING AND LOWERING DEVICE FOR HARVESTERS.
No. 407,599. Patented July 23, 1889.
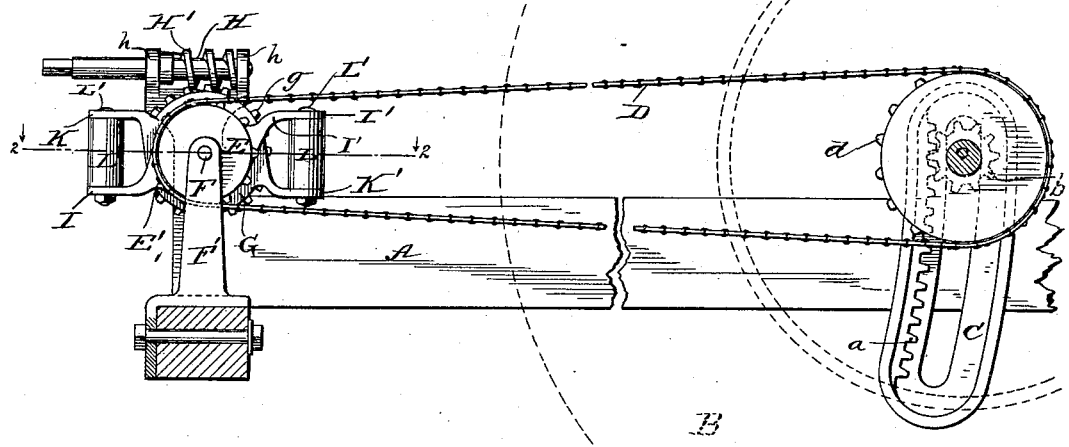
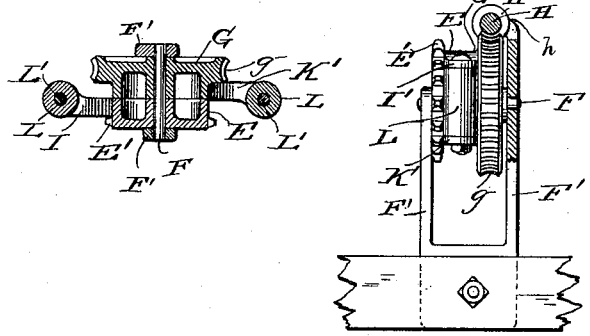
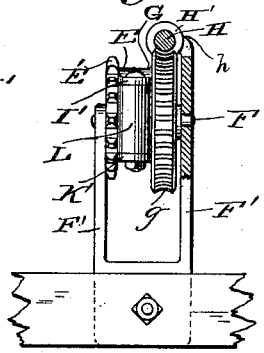
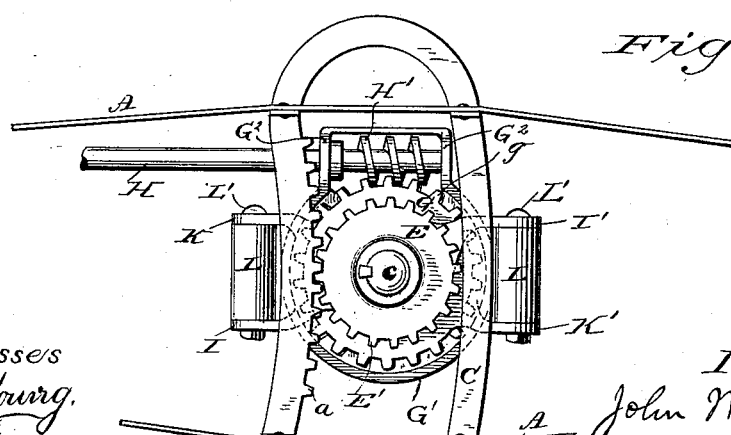
Witnesses
Geo. W. Young.
M. F. Frear.
Inventor
John W. Latimer
By Stent & Underwood
Attorneys (No Model.) 2 Sheets—Sheet 2.

J. W. LATIMER.
RAISING AND LOWERING DEVICE FOR HARVESTERS.

No. 407,599. Patented July 23, 1889.

Witnesses
Geo. W. Young.
M. F. Frear.

Inventor
John W. Latimer
By Stout & Underwood
Attorneys

UNITED STATES PATENT OFFICE.

JOHN W. LATIMER, OF MILWAUKEE, WISCONSIN, ASSIGNOR TO THE MILWAUKEE HARVESTER COMPANY, OF SAME PLACE.

RAISING AND LOWERING DEVICE FOR HARVESTERS.

SPECIFICATION forming part of Letters Patent No. 407,599, dated July 23, 1889.

Application filed December 16, 1887. Serial No. 258,076. (No model.)

*To all whom it may concern:*

Be it known that I, JOHN W. LATIMER, of Milwaukee, in the county of Milwaukee, and in the State of Wisconsin, have invented certain new and useful Improvements in Raising and Lowering Devices for Harvesters; and I do hereby declare that the following is a full, clear, and exact description thereof.

My invention relates to harvesters, and will be fully described hereinafter.

In the drawings, Figure 1 is a side view of a portion of a harvester with my device in place thereon. Fig. 2 is a detail section on line 2 2, Fig. 1. Fig. 3 is an end view with the chain omitted. Fig. 4 is a side elevation of a modification, and Fig. 5 is a partly-sectioned plan of the same.

A is a portion of the harvester-frame, and B (dotted lines, Fig. 1, and full lines, Fig. 5) the bull-wheel.

C are curved racks, one of which is hung from the harvester-frame on each side of the bull-wheel. The axle $c$ of the bull-wheel carries pinions $b$, one on each end, and these pinions engage with the teeth $a$ of the racks C. Both pinions are keyed to the axle, which latter also has keyed to it a sprocket-wheel $d$, which is located between one of the racks and the bull-wheel. This sprocket-wheel is connected by a belt D with the sprocket-toothed rim E' of a sleeve E, that fits loosely on a shaft F, which shaft has its bearings in standards F', that project up from one of the beams of the harvester-frame. The shaft F also carries another loose sleeve G, and the inner ends of these sleeves abut against each other.

The sleeve E is provided with two arms I I', which project from it in opposite directions, the arm I lying in a plane below that of the axis of the sleeve and the arm I' in a plane above that of the axis, and the sleeve G is provided with like arms K and K', and all of these arms are inset toward an intermediate vertical plane, so that the outer end of arm K will overhang the outer end of arm I, and the outer end of arm I' will overhang the outer end of arm K', and then between the arms I and K is inserted a spring L, and a like spring is inserted between arms I' and K', each spring being held in place by a bolt L', which fits loosely in openings in the ends of the arms and passes through the spring. The result of this construction is, that the two sleeves are so connected that while they are capable of slight independent movement, owing to the elasticity of the springs, the turning of sleeve G will cause the sleeve E to rotate.

The sleeve G is formed with worm-teeth $g$ on the periphery of its outer end for engagement with a worm-shaft H, that is supported in bearings $h\,h$ on one of the standards F or F'.

The worm-teeth H' of the shaft H of the teeth $g$ on the sleeve G by engagement with each other lock the sleeve G, while the arms of sleeve G, acting through springs L, lock the sleeve E; hence the weight of the harvester will fall on the springs L, as the tendency of the pinions $b$ to turn and ride down the racks will be resisted by the sprocket-wheel $d$, which is prevented from revolving (except as the springs yield) by the belt D and toothed rim E' of sleeve E. The harvester is raised and lowered by turning the shaft H, which, acting through the worm-gear, sleeves, springs, belt, and sprocket-wheels, will revolve the axle in the proper direction, according as the shaft is turned to the right or left.

In the modification shown in Figs. 4 and 5 I provide the sleeve E with pinion-teeth E' for engagement with one rack, and the other rack is engaged by the teeth E' of a pinion E². I also use a sleeve G, like that in Fig. 2, as a companion for sleeve E, and connect the two sleeves by arms I I' and K K' and springs L; but the sleeves are placed directly on the axle, and the toothed portion and inner end of sleeve G are inclosed by a housing G', that is carried by the axle, and this housing is formed with connected ears G², that form the inner bearings for the shaft H, which latter corresponds to shaft H of Fig. 1, but extends out in the form of a tumbling-rod to the rear beam of the harvester, where it has its outer bearing at $j$. The sleeve E and pinion E² are keyed to the axle $c$, while the sleeve G fits loosely thereon; hence when the sleeve G is revolved by shaft H and its worm its arms, acting on the arms of sleeve E through the springs, will revolve sleeve E and the axle and cause the pinions to ride up or down on the rack and raise or lower the harvester, and when the parts are at rest the worm-gear will lock the sleeve G.

Having thus fully described my invention, what I claim as new, and desire to secure by Letters Patent, is—

1. In a harvester, the combination of the bull-wheel, its axle and pinions, the racks suspended from the harvester-frame in which the pinions engage, two sleeves loosely carried by a suitably-supported shaft, each of said sleeves having a pair of arms, the arms of each pair extending in opposite directions from each other, and an arm of each sleeve overhanging an arm of the other sleeve, a spring interposed between the opposing arms of the two sleeves, gearing for revolving one of the sleeves, and means, substantially as described, for connecting the other sleeve with the bull-wheel axle, whereby the latter will be supported by the sleeves and be revolved or prevented from revolving by them.

2. In a harvester, the combination of the axle and its pinions, the racks suspended from the harvester-frame, a sprocket-wheel keyed to the axle, a shaft mounted in standards projecting up from the harvester-frame, a pair of sleeves loose on said shaft, each having a pair of arms projecting out from it in opposite directions, with an arm of each sleeve overhanging the arm of its neighbor, a spring interposed between the opposing arms of the two sleeves, an operating-shaft, and gearing connecting the operating-shaft with one sleeve, and sprocket-gear connecting, by means of a sprocket-chain, the other sleeve with the sprocket-wheel on the bull-wheel axle, substantially as described.

In testimony that I claim the foregoing I have hereunto set my hand, at Milwaukee, in the county of Milwaukee and State of Wisconsin, in the presence of two witnesses.

JOHN W. LATIMER.

Witnesses:
S. S. STOUT,
H. G. UNDERWOOD.